June 17, 1930. H. J. MURPHY 1,763,809
CONVEYER APPARATUS
Filed Aug. 24, 1928  2 Sheets-Sheet 2
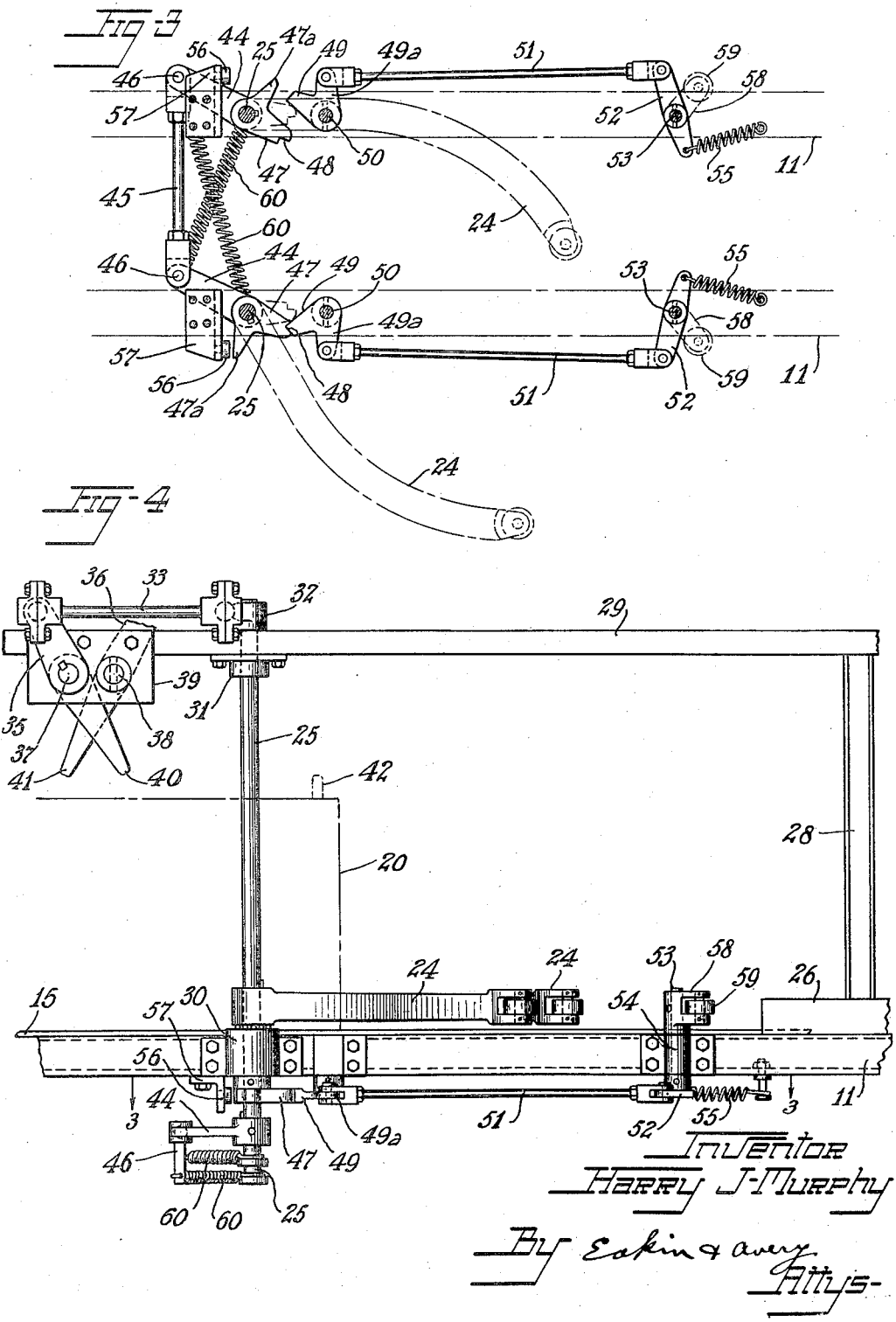

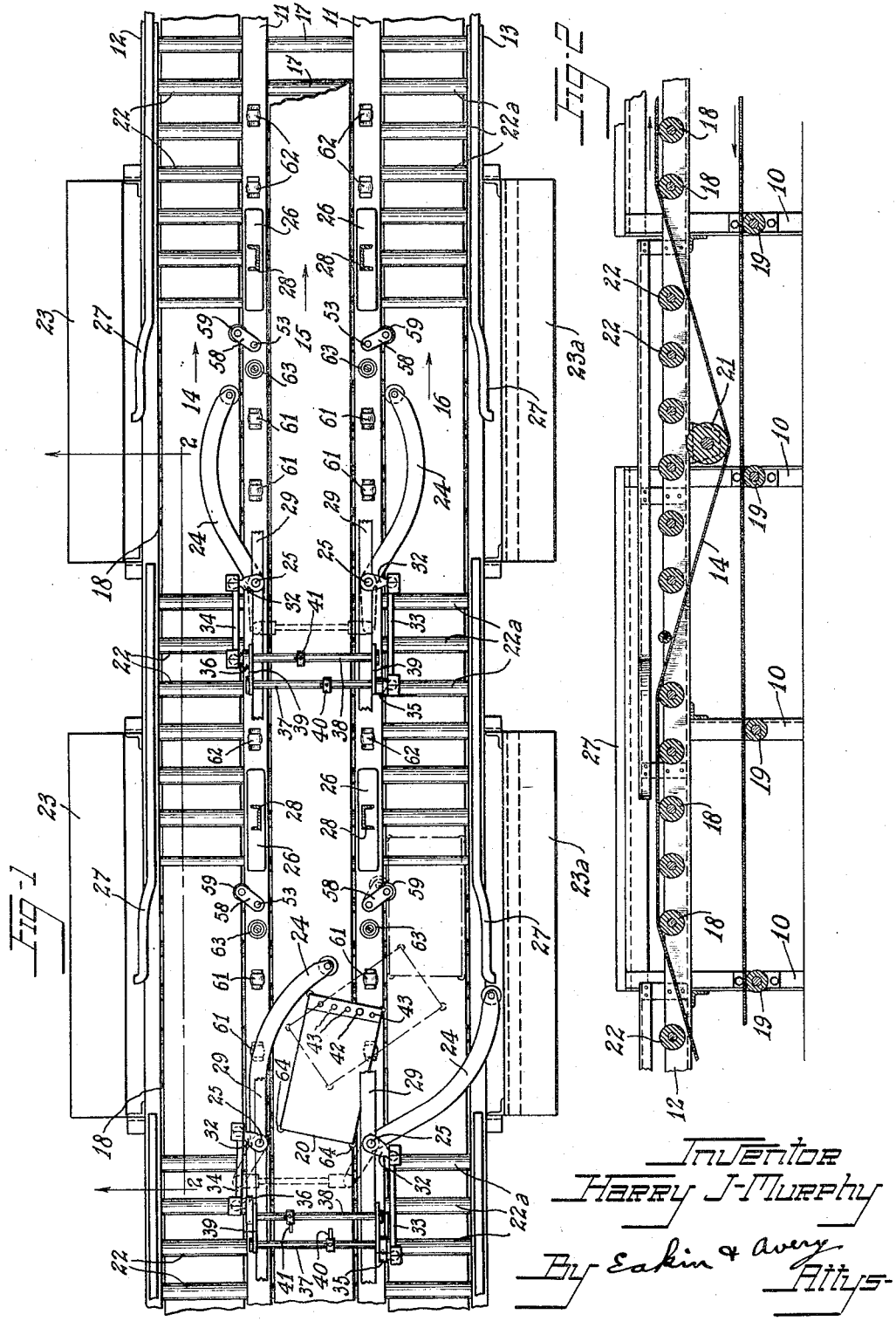

Patented June 17, 1930

1,763,809

UNITED STATES PATENT OFFICE

HARRY J. MURPHY, OF AKRON, OHIO, ASSIGNOR TO THE B. F. GOODRICH COMPANY, OF NEW YORK, N. Y., A CORPORATION OF NEW YORK

CONVEYER APPARATUS

Application filed August 24, 1928. Serial No. 301,832.

My invention relates to conveyers, and more especially to endless conveyer systems wherein articles carried thereon are diverted mechanically at determinate work-receiving stations.

The principal object of my invention is to provide a switch mechanism whereby one endless conveyer can serve a greater number of work-receiving stations than is possible with the conveyer systems heretofore used.

Another object is to provide, in an endless conveyer, a switch mechanism whereby work-receiving stations arranged directly across from each other at the sides of an endless conveyer can be selectively served by the said conveyer, thus conserving factory floor space by avoiding the necessity of the usual staggered arrangement of stations where a single conveyer is employed, and avoiding the necessity for employing two conveyer belts where work-receiving stations are arranged opposite each other at the sides of the conveyers.

A more specific object is the provision of a switch mechanism, for use with endless conveyers for diverting an article laterally therefrom selectively to the right or to the left, whereby the stations may be positioned closer longitudinally on either side of the conveyer than when the usual switches are employed.

In the preferred embodiment of my invention:

Fig. 1 is a plan view of part of a conveyer system embodying my invention, parts being broken away and in section.

Fig. 2 is a vertical section taken on line 2—2 of Fig. 1, shown somewhat enlarged.

Fig. 3 is a section on line 3—3 of Fig. 4.

Fig. 4 is a side elevation of the article-deflecting mechanism.

Referring to the drawings, 10, 10 are vertical standards and 11, 11, 12, 13 are horizontal, parallel side members of a conveyer-supporting framework. Mounted upon said framework are three belt conveyers 14, 15 and 16 which are suitably driven at the same surface speed from end pulleys (not shown) and which travel in the same direction as indicated by the arrows in Fig. 1. The middle conveyer belt 15 has its upper reach supported upon idler rolls 17, 17 journaled in the respective frame members 11, its lower reach resting upon similar idler rollers (not shown). The lateral conveyers 14, 16 are identical in construction and arrangement so that only the conveyer 14 will be described, corresponding parts associated with the conveyer 16 bearing the same numerals with the exponent "a".

The upper reach of the conveyer 14 is carried on idler rolls 18, 18 journaled in the frame members 11, 12, and its lower reach is carried upon similar idler rolls 19, 19 journaled in the respective vertical standards 10. At intervals along the conveyer 14 are work stations where raw material, preferably carried in boxes or containers such as the container 20, is diverted from the conveyer 15 and brought to rest to permit work to be done thereon. At such stations the belt of the conveyer 14 is held down below the level of its carrying reaches by a roller 21 under which the belt passes, and a plurality of idler rolls 22, 22 are journaled in the frame members 11, 12 above the conveyer with their tops on the level of the top of the conveyer belt at each side of the station. The rolls 22 provide a support for a container 20 delivered thereto by the conveyer 14, and permit easy manual movement of the container for starting it back onto the conveyer 15.

Work tables or shelves 23, 23 are mounted upon the frame members 12 beside the conveyer 14 at each of the work stations, said shelves providing a support for material removed from the containers 20 while said material is worked upon by an operator.

The work stations along the conveyer 14 and the conveyer 16 are opposite each other which allows for a greater number of stations, with consequent economy of floor space, than where the stations of the respective belts are required to be in staggered relation because of the particular type of deflecting means employed.

For deflecting containers 20 from the middle conveyer 15 onto either of the side conveyers at the respective work stations therealong, I provide each pair of oppositely-positioned work stations with a pair of arcuate deflector arms 24, 24 which are mounted upon respective vertical shafts 25, 25 and arranged to swing in unison in either direction so that one of the arms extends across the conveyer 15 in position to deflect a carrier 20 thereon, as shown in Fig. 1 with relation to the work stations at the left thereof, while the other arm swings to a position where it will not interfere with the transfer of the container. The normal inoperative position of the deflector arms is generally parallel to the conveyer 15 at each side thereof so as not to impede the progress of containers thereon which are not destined for either of their particular stations, as is most clearly shown in Fig. 1 with relation to the work stations at the right thereof.

Each work station is provided with lateral guides which are positioned above the plane of the conveyers and assure the proper lateral positioning of the work containers thereon. Said guides are mounted upon the frame members 11, 11 and on the frame members 12, 13, those on the frames 11, designated 26, 26, being of relatively short length, and those on the frames 12, 13, designated 27, 27, being of relatively long length and curved at the receiving end of the work stations in continuation of the curve of the adjacent deflector arm 24 when the latter is in operative deflecting position.

The deflector arms are so positioned with relation to their respective work stations that containers are deflected from the conveyer 15 onto either conveyer 14 or 16 in advance of the adjacent work station so that the latter conveyers may assist in the transfer of the container from one conveyer to the other and then impell the container onto the idler rolls 22, 22ª of the work station.

Rising from the respective guides 26 are vertical supports 28, 28, which carry upon their upper ends parallel horizontal frame members 29, 29 which are positioned above the respective frame members 11, 11. The shafts 25 of the deflector arms 24 are journaled in bearings 30, 31 (Fig. 4) mounted on the frame members 11 and 29 respectively, the end portions of the shafts extending beyond said bearings.

For swinging the deflector arms 24 to divert a container 20, the upper ends of the shafts 25 are provided with respective laterally-projecting lever arms 32, 32 which are connected respectively, by ball and socket joints, with the adjacent ends of respective push rods 33, 34, the other ends of said push rods being connected by ball and socket joints to respective levers 35, 36 mounted upon the ends of respective parallel shafts 37, 38 journaled in brackets 39, 39 secured to the frame members 29. The shafts 37, 38 traverse the conveyer 15 and are provided with longitudinally-positionable depending fingers 40, 41, the positions of which correspond to the two oppositely-positioned work stations whose deflector arms they control. The fingers 40, 41 extend into the path of and are actuated by pins such as the pin 42 which is selectively mounted in a suitable socket of a series of sockets 43, 43 formed in the upper part of the leading end of the container 20.

The deflector arms 24 require to be moved in unison in the same direction, for although but one arm is required to divert a container, the other arm of the pair requires to be swung clear of the container so as not to obstruct its progress. For this purpose the lower ends of the shafts 25 are provided with respective lever arms 44, 44, and the free ends of each pair of the latter are connected to the respective ends of a link 45 by pivot pins 46, 46. Thus the tilting of either finger 40, 41 by a pin 42 of a container will swing both arms 24 concurrently and in the same direction.

During the container-deflecting operation the arms 24 are locked in their angular position to provide suitable rigidity against the impact of the container. For this purpose the end portions of the shafts 25 below the journals 30 are provided with respective latch members 47, 47 each having its free end notched as at 48 to engage a dog 49 pivoted at 50 on the frame member 11. The dog 49 is formed with a lever arm 49ª which is connected to one end of a link 51, and the other end of said link is connected to one end of a lever 52 mounted at its middle upon a vertical shaft 53 journaled in a bracket 54 mounted upon the frame member 11, the other end of the lever 52 being connected by a tension spring 55 to the frame member 11. The arrangement is such that the dogs 49 are normally yieldingly urged toward latching position, and engage the notches 48 in the latches 47 alternatively as the latter move past the ends of the dogs during the rotation of the shafts 25 as the deflector arms are swung in either direction.

Each latch 47 is formed with an outstanding finger 47ª adapted to abut a stop 56 of yielding material such as rubber, to limit the swinging movement of the arms 24, the stop 56 being mounted in a bracket 57 mounted upon the frame member 11.

For restoring the deflector arms 24 to normal parallel position after a container has been deflected onto a lateral conveyer, lever arms 58, 58 having their free ends provided with respective rollers 59, 59 are mounted upon the upper ends of the respective shafts 53 and extend over the conveyers 14, 16 in position to be engaged by a container carried thereon, and, by turning the shafts 53, to withdraw the dogs 49 from the latches 47. The position of the lever arms 58 is at the receiving end of the work stations as embodied in the rolls 22, and the arms 24 are released as soon as the leading end of the container reaches this position. Tension springs 60, 60 of equal strength connect the respective shafts 25 with the pivot pins 46 on the opposite sides of the conveyer 15 with the result that the arms 24 are normally urged toward parallel inoperative position. Thus the arms automatically return to parallel position when either dog 49 is disengaged from its latch 47.

The work stations are of sufficient length to accommodate two containers 20, so that the operator always has work before him, a container being delivered to the station whenever one is dispatched. When two containers are at a work station, the last-delivered container occupies a position in contact with the lever arm 58 which prevents the latter from returning to its normal position over the lateral conveyer. In this position of the arm 58 the dog 49 is in a position where it will not engage the latch 47 as the latter is swung past it, with the result that another container destined for the already filled work station will actuate the deflector mechanism to swing the arms 24 to deflecting position, yet the latter will not latch in that position and will return to normal parallel position and permit the container to continue its course on the main conveyer 15.

A plurality of rollers 61, 61 are journaled in the frame-members 11 on horizontal axes parallel to the latter, and with their tops slightly above the level of the conveyers 14, 15, 16. Said rollers are suitably positioned between the deflector arms of each pair of arms to facilitate the transfer of a container 20 from the conveyer 15 to either conveyer 14 or 16, and similar rollers 62, 62 are positioned beside each group of rolls 22 to facilitate the transfer of containers from the respective work stations back onto the conveyer 15. Respective rollers 63, 63 are mounted upon vertical axes upon the frame members 11 immediately in front of the shafts 53 to assist in aligning the containers as the latter pass onto either of the lateral conveyers 14 or 16.

The lower corners of the containers 20 preferably are provided with anti-friction rollers 64, 64 to reduce the friction of the containers with the arms 24 during a diverting operation.

In the operation of the apparatus, a container 20 is loaded with material to be fabricated, the pin 42 mounted in the proper socket 43 therein to cause the container to be diverted to the proper work station, and the container placed upon the moving conveyer 15 at the receiving end thereof. Assuming that the container is destined for the lower left-hand station on the conveyer 16 as shown in Fig. 1, as soon as it arrives thereat the pin 42 engages the depending finger 40 and swings the arms 24 to deflecting position through the medium of the shaft 37, lever 35, link 33, lever 32 and shaft 25, one of the latches 47 moving past the dog 49 and permitting the latter to engage its notch 48 to hold the arms 24 in deflecting position. The leading end of the container 20 strikes the arm 24 that extends across the conveyer 15 and is deflected obliquely thereby so that it moves onto one of the rollers 61 which raises the forward end of the container off the conveyer 15, the trailing end of the container remaining on said conveyer and being impelled by it. The direction of rotation of the rollers 61 is at right angles to the travel of the belt conveyers, and the resulting oblique movement of the container is so facilitated by the rollers 61 as to divert the container out of contact with the arm 24 shortly after its initial engagement therewith. As the center of gravity of the container passes over the rollers 61 the container tilts so that its trailing end leaves the conveyer 15 and its leading end engages the conveyer 16, the latter impelling the container toward the rollers 22ª of the work station while the rollers 61 direct its trailing end onto said conveyer. Roller 63 and lateral guides 26 and 27 align the container on the conveyer 16.

As the container passes onto the rollers 22ª of the work station its leading end engages the lever arm 58 and turns the same and its shaft 53, to release the dog 49 from the latch 47 and permit the springs 60 to restore the arms 24 to normal parallel inoperative position.

The operator moves the container to a convenient position upon the rollers 22ª and performs the necessary operations upon the material carried by the container. A second container delivered to the station while the first is still there will occupy a position engaging the lever-arm 58 so that the latter will not be restored by the spring 55 after its latch-disengaging movement, and no more containers will be diverted to the station until one of the containers departs therefrom.

The container is removed from the work station manually by pushing it over the rollers 62 back onto the main conveyer 15.

The use of my invention effects substantial economy of floor space and power consumption. It permits work stations to be positioned opposite each other, and in closer proximity to each other on the same side of the conveyer than was possible heretofore where a single trunk conveyer was employed.

The other advantages expressed or implied in the statement of objects of the invention are thus attained.

The invention may be modified within the scope of the appended claims.

I claim:

1. A conveyer system embodying a trunk conveyer for carrying articles, work stations positioned at the respective sides of the trunk conveyer along the path of travel thereof, respective deflectors for diverting articles from the trunk conveyer onto the work stations, means operable by an article for effecting operation of the deflectors selectively, and mechanism so controlling the deflectors that one of the same moves away from the trunk conveyer when another moves to a position over the same to divert the article.

2. Conveyer apparatus comprising a trunk conveyer for carrying articles, work stations positioned opposite each other on opposite sides of said conveyer, interconnected article-diverting means operable by the article to divert the same from said conveyer to either of said stations, and means selectively positioned on the article for actuating the diverting means to divert the article to a determinate station.

3. Conveyer apparatus comprising a trunk conveyer for carrying articles, work stations positioned substantially opposite each other on opposite sides thereof, interconnected article-diverting arms operable by an article to divert the same from said conveyer to either of said stations, mechanical means carried by the article for so actuating said diverting arms, and means for latching the latter in article-diverting position.

4. Apparatus as defined in claim 3 including means for releasing said latching means after the article is diverted to a work station.

5. Conveyer apparatus comprising a trunk conveyer, lateral conveyers at each side thereof, work stations positioned along said lateral conveyers and substantially opposite each other across the trunk conveyer, and diverting members at each station operable by an article being carried upon the trunk conveyer, each of said diverting members being adapted selectively to divert the article onto either of said lateral conveyers at a work station therealong.

6. Conveyer apparatus comprising a trunk conveyer, a pair of deflectors pivoted on separate axes to swing into and out of diverting position over the trunk conveyer, means interconnecting the said deflectors to compel them to operate in unison, and means operable by an article being carried upon the trunk conveyer for actuating said deflectors.

7. Conveyer apparatus comprising a trunk conveyer, lateral conveyers at each side thereof, and article-diverting means for diverting an article from the trunk conveyer selectively onto either of the lateral conveyers, said diverting means comprising a pair of arms adapted respectively to divert an article onto either of said lateral conveyers and so interconnected that when one arm moves to an operative article-diverting position the other arm moves to a position where it will not obstruct the progress of said article.

8. Swith mechanism for use with conveyers, said mechanism comprising deflecting means mounted at the respective sides of a conveyer at the same point in its path for swinging movement into and out of the path of an article carried upon said conveyer whereby the said article may be diverted selectively in a lateral direction either to the right or left of the conveyer.

9. Swith mechanism as defined in claim 8 in which the deflecting means has associated therewith means for normally holding the deflecting means out of the path of an article carried on the main conveyer.

In witness whereof I have hereunto set my hand this 6th day of August, 1928.

HARRY J. MURPHY.